June 16, 1959 C. HAINES, JR 2,890,739
SEGMENTED INSULATION AND METHOD OF INSTALLING THE SAME
Filed Nov. 30, 1954
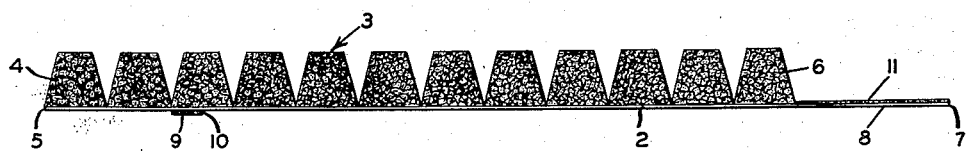
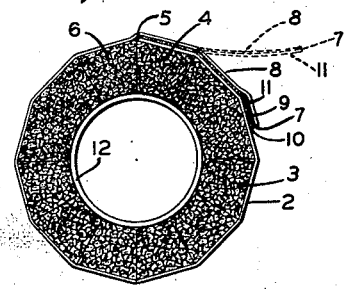
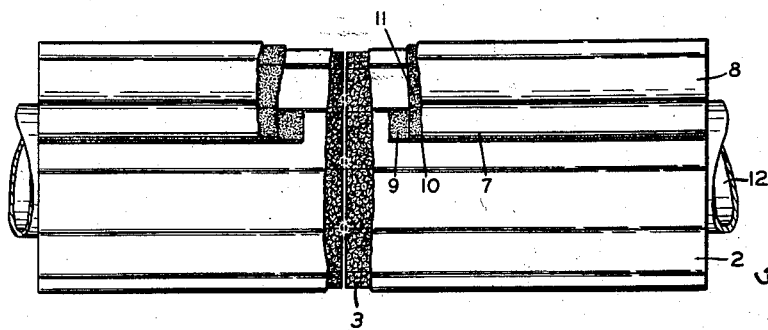
INVENTOR
CHARLES HAINES, Jr.
by
ATTORNEY

United States Patent Office 2,890,739
Patented June 16, 1959

2,890,739
SEGMENTED INSULATION AND METHOD OF INSTALLING THE SAME

Charles Haines, Jr., Manheim Township, Lancaster County, Pa., assignor to Armstrong Cork Company, Lancaster, Pa., a corporation of Pennsylvania Application November 30, 1954, Serial No. 472,056

8 Claims. (Cl. 154—28)

This invention relates to a segmented insulation and method of installing the same. It is concerned more particularly with the prefabrication and erection of segmented cork pipe covering in such manner as to insure a good tight and smooth joint at the overlapped portion of the "wrapper" to which the segments of insulation material are attached, to avoid air and vapor infiltration into the insulation and to provide a neat installation which may be readily painted, if desired.

Segmented insulation generally is formed by adhesively bonding a row of strips of insulation material of generally truncated triangular cross section to a flexible wrapper or supporting layer, commonly in the nature of a waterproof and vaporproof creped kraft paper laminate. The segments extend along the length of the wrapper, and a flap is provided which projects beyond the row of segments and is adapted when the insulation is erected to overlie the joint between the outermost segments which are brought into abutting engagement when the covering is wrapped around a cylindrical surface to be insulated—a pipe, for instance. Adhesive is generally used to secure the flap in position.

The insulation may be under some compression when installed, and its tendency to re-expand necessitates that where an adhesive type joint is provided at the overlapped portion of the wrapper, the adhesive immediately holds the unit under such compression, eliminating the need for metal or wire ties or clamps to hold the assembly in position during adhesive activation.

An object of the present invention, therefore, is to provide a segmented insulation and method of installing the same which will provide for the adequate holding of the insulation sections in proper position without the need for wire ties or the like.

Some adjustment of the flap is frequently necessary during erection of the covering to bring the individual segments and the adjacent sections of covering into proper position. This requires that some sliding motion of the flap of the wrapper be possible during erection.

Another object of the invention, therefore, is to provide a segmented insulation and method of installing it which permits ready adjustment of the individual segments and the adjacent sections of covering during erection.

According to the present invention, a segmented insulation is fabricated by providing a flexible supporting layer or wrapper having segments of insulation secured to one side thereof. A flap on the wrapper projects beyond the segments and is adapted when the covering is wrapped around a surface to be insulated to overlie the opposite end of the wrapper and provide overlapping surfaces for adhesive securement of the insulation in wrapped position. A narrow band of latently adhesive material is disposed on the outer surface of the supporting layer and spaced from the end thereof opposite to the flap for engagement by the terminal edge of the flap when the insulation is wrapped around a surface to be insulated, the adhesive serving to bond the flap to the supporting layer in wrapped position when an adhesive carried by the flap on the inner surface of the wrapper is brought into engagement therewith.

This material may be erected by applying adhesive to the flap, the inner surface of this adhesive including a solvent which has a solvent action on the band of latently adhesive material, wrapping the insulation around the surface to be insulated, bringing the flap carrying the adhesive into engagement with the outer surface of the wrapper in the adhesive-free area to provide a mobile bond, bringing the segments into proper position and adjusting the flap in the overlapped area, and thereafter pressing the adhesive on the flap into engagement with the latently adhesive material on the outer surface of the supporting layer to form an immovable bond at the overlapped portion.

In order that the invention may be more readily understood, a preferred embodiment thereof will be described in conjunction with the attached drawing, in which:

Fig. 1 is an end view of a section of segmented insulation embodying the invention;

Fig. 2 is an end view showing a section of the segmented insulation of Figure 1 applied to a piece of pipe and illustrating the method of the invention; and Figure 3 is a plan view, partially broken away, showing a section of the insulation as finally erected on a piece of pipe.

Referring to Figure 1, the insulation includes a flexible supporting layer or wrapper 2 which may be of laminated construction including inner and outer layers of creped kraft paper between which a thin membrane of aluminum foil, for instance, is bonded by films of an asphalt adhesive. This type of structure is more fully disclosed and is claimed in the copending application of Henry C. Brown, Serial No. 439,707, filed June 28, 1954, and issued as U. S. Patent No. 2,776,231 on January 1, 1957. Mounted on the inner side of the wrapper 2 are a plurality of segments 3 of thermal insulation material, such as strips of corkboard which are adhesively secured to the backing in edge-to-edge abutting relationship. The innermost segment 4 is preferably disposed parallel to the inner edge 5 of the backing 2, and the outermost segment 6 is spaced inwardly from the outermost edge 7 of the backing 2. The portion of the backing between the segment 6 and the edge 7 constitutes a flap 8, the function of which will be more fully hereinafter described.

There is applied to the outer side of the backing 2 a band 9 of latently adhesive material. This band of adhesive preferably extends along the full length of the wrapper 2 parallel to the length of the segments 3 and is so disposed with respect to the inner edge 5 of the backing that, when the covering is wrapped around a pipe, for instance, and the flap 8 is brought into overlapping position, the edge 7 of the backing will be essentially coterminous with the edge 10 of the band of adhesive 9. The band of adhesive may, for example, be about 1" wide and is preferably applied at the place of manufacture of the insulation and fully dried. The following adhesive composition may be used:

Example I

| | Parts by weight |
|---|---|
| Rubber base (neoprene-polychloroprene) | 100 |
| Stabilizer (magnesium oxide) | 5 |
| Curing agent (zinc oxide) | 5 |
| Tackifier resin (phenol-formaldehyde) | 75 |
| Solvent (toluol) | 435 |

This adhesive contains about 30% solids. The magnesium oxide and zinc oxide perform the added function of acid acceptors.

If desired, a layer of the adhesive of Example I may be applied to the inner surface of the backing 2 at the flap 8 and dried. The insulation as delivered to the job thus may be as shown in Figure 1.

It may be desirable, however, to apply the adhesive layer 11 at the job site by brushing a thick coating of it onto the inner surface of the backing 2 at the flap 8. The adhesive for field application may be formulated as follows:

*Example II*

| | Parts by weight |
|---|---|
| Rubber base (neoprene-polychloroprene) | 100 |
| Stabilizer (magnesium oxide) | 5 |
| Plasticizer (chlorinated biphenyl) | 15 |
| Tackifier resin (phenol-formaldehyde) | 75 |
| Solvent (methyl ethyl ketone and solvent naphtha in equal proportions) | 430 |

This adhesive, like the adhesive of Example I, contains about 30% solids.

The solvent for the composition of adhesive layer 11 (Example II) is also a solvent for the composition of adhesive layer 9 (Example I). Thus, when layer 11 is brought into contact while wet with layer 9 which is dry, the solvent in layer 11 will be effective for activating the surface portion at least of layer 9 and forming a good immobile bond between the two.

It is known that certain adhesives when "wet" have good mobility when used "single-faced" and thus permit shifting of the parts to be assembled by movement internally of the adhesive layer or film. These same adhesives when used "double-faced" have great affinity for one another. Thus, the adhesive applied to one of the faces to be joined and then dried, when brought into engagement with another face coated with the same adhesive in a "wet" condition (preferably within a minute or so after application of the adhesive), forms a good, substantially immobile bond between the two portions.

If both layers of adhesive are applied at the factory, they may be essentially fully dry at the time of erection and, with the adhesive composition of Example I, the adhesive layer 11 will form a mobile bond when applied to the area of the wrapper between the edge 5 and the narrow band of adhesive 9. However, when the adhesive layers 9 and 11 are brought into engagement, there is immediately formed an immobile bond between the two in such area of contact, and the wrapper is securely held in final position.

In carrying out the method of this invention, the adhesive layer 11 is applied to the flap 8 or, if the adhesive layer has been applied at the factory and dried, it may be coated with a solvent such as toluol which softens the adhesive. If the layer of adhesive is applied at the job site, it is preferably permitted to dry for 30 to 60 seconds to develop a surface tack. This drying time will depend, of course, upon atmospheric conditions, especially temperature and humidity.

The covering is then wrapped around the pipe 12 or other surface to be insulated, and segments 4 and 6 are placed together by the workman who places his hands around the covering, works the segments into proper position, and places them under that degree of compression necessary to bring the outermost and innermost segments 4 and 6 into proper abutting relationship. The flap 8 is placed over the segment 4 with the adhesive layer 11 being brought into engagement with the outer surface of the backing layer 2 in the area between the edge 5 and adhesive band 9. The flap 8 will extend outwardly, as diagrammatically shown in dotted lines in Figure 2. The single-faced application of adhesive in this area (the area between edge 5 and adhesive band 9 is uncoated) allows a high shear movement of the adhesive 11 over the wrapper, making it possible to slide the segments into proper position and to smooth the flap 8, avoid any buckles, and correct any misalignment of the covering. Then, the flap 8 is brought down over the adhesive strip 9 and pressed into engagement therewith. There is an immediate firm bond developed between the layers 9 and 11. The bond is essentially immovable, characteristic of a double-faced adhesive joint with the rubber base type of adhesive.

It will be noted that with the present covering the entire outer surface of the wrapper 2 may be "dry," for the latently adhesive layer 9 may be essentially or completely freed of solvent before erection of the covering is commenced. This avoids the problem of the workman getting his hands into wet adhesive and smearing it over the surface of the covering and also making it difficult for him to make a rapid installation. With the dry latently adhesive material on the outer surface, the inner surface in the area of adhesive 11 may be "wet," may be essentially fully dried (freed of solvent, for instance, with the adhesives of Examples I and II), may be surface-softened with a solvent, or may have a surface tack developed by applying the adhesive at the job site and permitting surface drying for a minute or so. The workman may grasp the covering in a natural manner and by a sliding and rolling motion of his hands first bring the segments and sections into proper position, sliding the flap 8 over the uncoated portion of the wrapper over segment 4 and then with a continuation of the rolling motion of the hands bring the flap into position where the portions 9 and 11 of adhesive may be pressed into engagement with the fingers.

It will be clear from the foregoing description of certain embodiments of the invention that a structure is provided which may be readily installed with a minimum of effort and that the method created provides a finished insulation which will be free of objectionable openings in the wrapper at the overlapped flap portion for infiltration of air or vapor which might seriously affect the efficiency of the insulation and provides a neat, attractive outer surface which may be painted or otherwise coated with ease.

I claim:

1. A segmented insulation comprising a flexible supporting layer, segments of insulation secured to one side of said supporting layer, a flap on said supporting layer projecting beyond said segments and adapted when said covering is wrapped around a surface to be insulated to overlie the opposite end of said supporting layer and provide overlapping surfaces for adhesive securement of the insulation in wrapped position, and a narrow band of dry latently adhesive material disposed on the other side of said supporting layer and spaced from the end thereof opposite to said flap for engagement by the terminal edge of said flap when said insulation is wrapped around said surface to be insulated, said adhesive serving to bond said flap to said supporting layer in said wrapped position when engaged by a layer of adhesive carried by said flap.

2. A segmented insulation in accordance with claim 1 in which said flap on the side to which the segments of insulation are secured carries an adhesive containing a solvent which is also a solvent for the band of latently adhesive material.

3. A segmented insulation in accordance with claim 1 in which said flap on the side to which the segments of insulation are secured carries an adhesive which is mobile when brought into engagement with the other side of said supporting layer and forms an immobile bond when brought into engagement with said band of latently adhesive material.

4. A segmented insulation in accordance with claim 3 in which said mobile adhesive on said flap is of essentially the same base composition as the band of latently adhesive material.

5. A method of installing segmented insulation including a flexible supporting layer and segments of insulation secured to one side of said supporting layer, with a flap of said supporting layer projecting beyond said segments and adapted when said covering is wrapped around a surface to be insulated to overlie the opposite end of said supporting layer and provide overlapping surfaces for adhesive securement of the insulation in wrapped position, the steps comprising providing a dried narrow band of latently adhesive material on the outer side of said supporting layer and spaced from the end thereof opposite to said flap to provide an adhesive-free area between said end and said band of dry adhesive, wrapping said insulation around a surface to be insulated, bringing an adhesive carried by said flap into engagement with said supporting layer in said adhesive-free area adjacent to said band of dried adhesive to provide a mobile bond, bringing said segments into proper position, adjusting said flap in said overlapped area, and thereafter pressing said adhesive on said flap into engagement with said dry latently adhesive material on said outer side of said supporting layer to form an immovable bond at the overlapped portion.

6. A method in accordance with claim 5 in which said flap on the side to which the segments of insulation are secured is coated with an adhesive including a solvent which has a solvent action on said latently adhesive material.

7. A method in accordance with claim 6 in which said flap adhesive is a rubber base adhesive and said latently adhesive material is also a rubber base adhesive.

8. A method in accordance with claim 5 in which said flap adhesive is a dry adhesive which forms a mobile band with said supporting layer and forms an immobile bond with said latently adhesive material when pressed into engagement therewith.

References Cited in the file of this patent

UNITED STATES PATENTS

| 348,187 | Burns | Aug. 31, 1886 |
| 397,822 | Suhr | Feb. 12, 1889 |
| 2,016,039 | Hurrell | Oct. 1, 1935 |
| 2,022,727 | Lee | Dec. 3, 1935 |
| 2,315,837 | Brown et al. | Apr. 6, 1943 |
| 2,376,854 | Saunders | May 22, 1945 |
| 2,401,987 | Taylor et al. | June 11, 1946 |
| 2,640,004 | Saun | May 26, 1953 |